United States Patent [19]

Injeyan et al.

[11] Patent Number: 5,818,856
[45] Date of Patent: Oct. 6, 1998

[54] OZONE COMPATIBLE STIMULATED BRILLOUIN SCATTERING MATERIALS

[75] Inventors: Hagop Injeyan, Glendale; Randall J. St. Pierre, Santa Monica, both of Calif.

[73] Assignee: TRW Inc., Redondo Beach, Calif.

[21] Appl. No.: 697,649

[22] Filed: Aug. 28, 1996

[51] Int. Cl.$^6$ ........................................ H01S 3/10
[52] U.S. Cl. .................................. 372/21; 372/3
[58] Field of Search ................. 372/21, 22, 55, 372/3

[56] References Cited

U.S. PATENT DOCUMENTS

| | | |
|---|---|---|
| H389 | 12/1987 | Moon . |
| 4,791,644 | 12/1988 | Dube ........................................ 372/3 |
| 4,866,720 | 9/1989 | Holly . |
| 4,924,475 | 5/1990 | Hinchen ................................... 372/55 |
| 4,958,908 | 9/1990 | Rockwell et al. . |
| 5,045,719 | 9/1991 | Ayral et al. . |
| 5,113,282 | 5/1992 | O'Meara et al. . |
| 5,144,630 | 9/1992 | Lin . |
| 5,216,535 | 6/1993 | Fellows . |
| 5,304,322 | 4/1994 | Kuse . |
| 5,325,380 | 6/1994 | Clendening et al. . |
| 5,379,147 | 1/1995 | Cook . |

OTHER PUBLICATIONS

H. Yoshida, et al., High–performance phase–conjugated stimulated–Brillouin–scattering mirror based on high–purity–liquid heavy fluorocarbons, Monday Morning/Cleo 1995, May 22, '95, pp. 1–2.

*Primary Examiner*—Leon Scott, Jr.
*Attorney, Agent, or Firm*—Michael S. Yatsko

[57] ABSTRACT

A device for producing phase conjugation of electromagnetic radiation using stimulated Brillouin scattering (SBS), comprising an SBS cell having a liquid perfluorocarbon as an SBS medium. The liquid perfluorocarbon is selected from the group of compounds having the formula $C_xF_y$, wherein $x>1$ and $y>4$. Preferably, $x>4$ and $y<16$, and most preferably, $4<x<7$ and $6<y<15$. Also, a solid state laser comprising the device. Also, a method for reducing the aberrations in a laser beam, such as aberrations created when the beam passes through an amplifying medium comprising the step of generating phase conjugation by SBS using a liquid perfluorocarbon as an SBS medium. Further, a method of producing an output laser beam comprising the steps of, generating an initial laser beam using a laser and phase conjugating the initial laser beam by SBS using a liquid perfluorocarbon medium as an SBS medium. The liquid perfluorocarbon is selected from the group of compounds having the formula $C_xF_y$, wherein $x>1$ and $y>4$. Preferably, $x>4$ and $y<16$, and most preferably, $4<x<7$ and $6<y<15$.

13 Claims, 6 Drawing Sheets

OZONE COMPATIBLE STIMULATED BRILLOUIN SCATTERING MATERIALS

BACKGROUND

Lasers are finding an increasing number of uses in a variety of fields. Moderate to high power solid-state lasers with excellent beam quality are especially needed for military, industrial and commercial applications.

The quality of a laser is in part determined by aberrations in the laser beam caused by the laser's amplifying medium. One method for correcting such aberrations is by optical phase conjugation using a stimulated Brillouin scattering (SBS) having a stimulated Brillouin scattering medium. Phase conjugation using stimulated Brillouin scattering is particularly useful in solid state lasers because Q-switching provides the high peak powers needed to exceed stimulated Brillouin scattering thresholds in such lasers. Further, other options for removing aberrations, such as flowing the medium, are not available for solid state lasers.

A number of substances have been used as the stimulated Brillouin scattering medium in solid state lasers, including benzene ($C_6H_6$), hexane ($C_6H_{12}$), Freon 113 ($C_2Cl_3F_3$), carbon tetrachloride ($CCl_4$), and methyl and dimethylcyclohexanes ($C_6H_{12}$—$CH_3$ and $C_6H_{12}$—$(CH_3)_2$, respectively). Each of these substances, however, has disadvantages. The presence of C—H bonds tend to absorb electromagnetic radiation having a wave length of approximately 1 $\mu$m, and are, therefore, not suitable for high power lasers such as Nd and Yb lasers which operate in this range. The chlorinated hydrocarbons, on the other hand, are associated with ozone layer depletion and are currently being phased out of industrial use.

Therefore, there remains a need for substances capable of serving as stimulated Brillouin scattering medium for use in a stimulated Brillouin scattering cell, in combination with lasers, which do not deplete the ozone layer and which do not have significant absorption near 1 $\mu$m. It would further be advantageous to have a stimulated Brillouin scattering medium which has a fast response time so that conjugation fidelity is preserved over a large dynamic range. It would still further be advantageous to have a stimulated Brillouin scattering medium which has a high damage threshold.

SUMMARY

The invention satisfies these needs. According to one embodiment of the present invention, there is provided a device for producing phase conjugation of electromagnetic radiation using stimulated Brillouin scattering (SBS). The device comprises an SBS cell having a liquid perfluorocarbon as an SBS medium. The liquid perfluorocarbon is selected from the group of compounds having the formula $C_xF_y$, wherein x>1 and y>4. Preferably, x>4 and y<16, and most preferably, 4<x<7 and 6<y<15.

According to another embodiment of the present invention, there is provided a laser for producing a laser beam. The laser comprises an SBS cell with a liquid perfluorocarbon as an SBS medium. The liquid perfluorocarbon is selected from the group of compounds having the formula $C_xF_y$, wherein x>1 and y>4. Preferably, x>4 and y<16, and most preferably, 4<x<7 and 6<y<15. In one embodiment, the laser has a power output greater than about 100 W. In another embodiment, the laser beam produced has a quality of less than about 2×D.L.

According to another embodiment of the present invention, there is provided a method for reducing the aberrations in a laser beam, such as aberrations created when the beam passes through an amplifying medium. The method comprises the step of generating phase conjugation using an SBS cell which has a liquid perfluorocarbon as an SBS medium. The liquid perfluorocarbon is selected from the group of compounds having the formula $C_xF_y$, wherein x>1 and y>4. Preferably, x>4 and y<16, and most preferably, 4<x<7 and 6<y<15.

According to yet another embodiment of the present invention, there is provided a method of producing an output laser beam. The method comprises the steps of, first, generating an initial laser beam using a laser. Then, phase conjugating the initial laser beam using an SBS cell which has a liquid perfluorocarbon medium as an SBS medium. The liquid perfluorocarbon is selected from the group of compounds having the formula $C_xF_y$, wherein x>1 and y>4. Preferably, x>4 and y<16, and most preferably, 4<x<7 and 6<y<15. The method can additionally comprise the step of amplifying the initial laser beam after the generating step.

DRAWINGS

These and other features, aspects and advantages of the present invention will become better understood with regard to the following description, appended claims, and accompanying figures where:

DESCRIPTION

According to one aspect of the present invention, there is provided a device for producing phase conjugation of electromagnetic radiation using SBS. Further, there is provided a laser incorporating the device.

Figure 1:
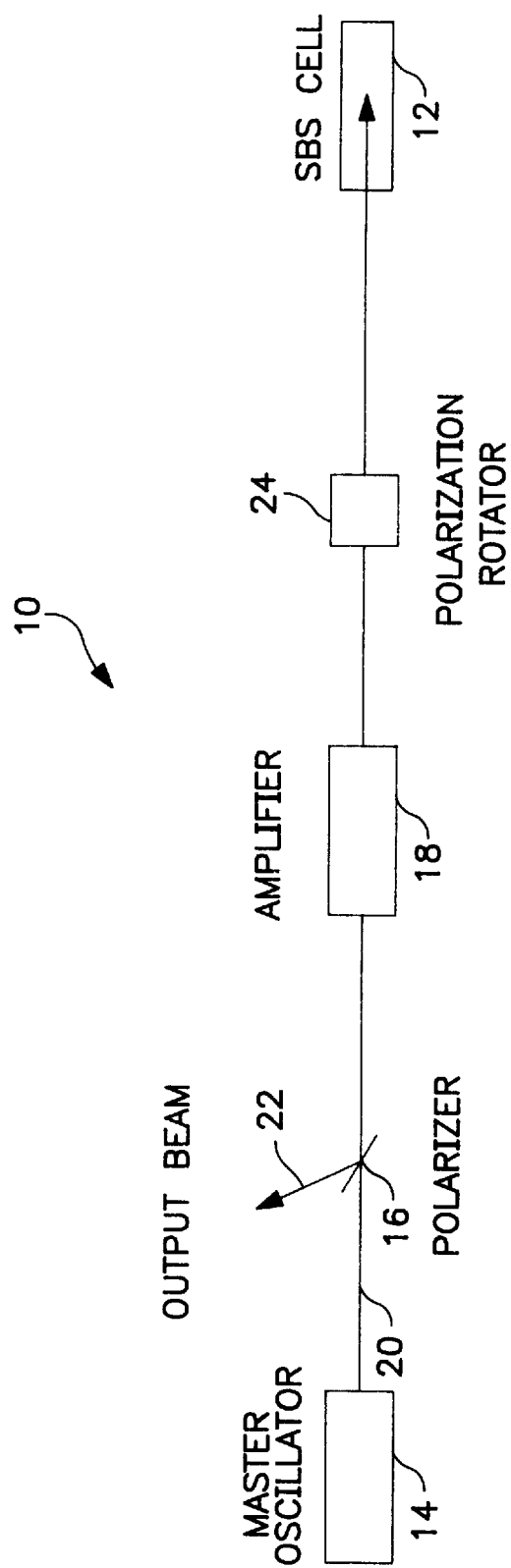
FIG. 1 is a schematic diagram of a laser having an SBS cell according to the present invention.

Referring now to FIG. 1, there is illustrated a schematic diagram of a laser 10 having an SBS cell 12 according to the present invention. As can be seen, the laser 10 further comprises a master oscillator 14, a polarizer 16, an amplifier 18 and a polarization rotating mechanism 24. The master oscillator 14 produces an initial, highly directed laser beam 20, which is directed by the polarizer 16 into the amplifier 18. The power of the initial beam 20 is increased as it passes through the amplifier 18. However, inhomogeneities in the media of the amplifier 18 introduce aberrations in the initial beam 20. These aberrations are substantially reduced by passing the initial beam 20 into the SBS cell 12, thereby causing a phase-conjugate beam to propagate backwards through the amplifier 18. This backwards propagation through the same inhomogeneities substantially corrects the aberrations in the initial beam 20. The beam 20 is then polarization rotated and passed out of the amplifier 18 where it is reflected by the polarizer 16 as an output laser beam 22 to a target (not shown).

As stated above, a number of substances are known to be useful as an SBS medium in an SBS cell, such as illustrated in FIG. 1. Among the substances are hydrocarbons such as benzene ($C_6H_6$,) hexane ($C_6H_{12}$), and methyl and dimethylcyclohexanes ($C_6H_{11}$—$CH_3$ and $C_6H_{10}$—$(CH_3)_2$, respectively), as well as chlorine containing carbon compounds such as Freon 113 ($C_2Cl_3F_3$) and carbon tetrachloride ($CCl_4$).

According to one aspect of the present invention, there is provided a device for producing phase conjugation of electromagnetic radiation using SBS. The device comprises an SBS cell for phase conjugation having a liquid perfluorocarbon as an SBS medium. The liquid perfluorocarbon is selected from the group of compounds having the formula $C_xF_y$, wherein x>1 and y>4. Preferably, x>4 and y<16, and most preferably, 4<x<7 and 6<y<15. Liquid perfluorocarbons are preferred because they have faster response rates due to shorter phonon lifetimes (approximately 1 ns) and, therefore, have larger SBS dynamic ranges than gaseous media. The short phonon lifetime allows the SBS process to follow the temporal buildup of the short (5–10 ns) Q-switched pulses and limits the intensity at the focal region by moving the reflection region upstream of the focal point. Liquids are also preferable to solid SBS media because they typically have higher damage thresholds.

Examples of liquid perfluorocarbons which are useful as SBS media according to the present invention include hexafluorobenzene ($C_6F_6$), perfluoro-methylcyclohexane ($C_6F_{11}$—$CF_3$), perfluoro-1,3-dimethylcyclohexane ($C_6F_{10}$—$(CF_3)_2$), and liquefied forms of carbon tetrafluoride ($CF_4$) and hexafluoroethane ($C_2F_6$). Advantageously, these compounds are not associated with ozone depletion. Further advantageously, this group of compounds has low levels of absorption near 1 μm, the operating range for Nd and Yb lasers.

These materials are commercially available, for example, from Aldrich Chemicals, of Milwaukee, Wis. Typically, these compounds are used in a relatively pure state, such as by taking commercially available materials having purity typically between about 80% and about 90%, distilling this material, and then running it through a 0.2 μm filter (to eliminate particulates). Mixtures of these materials can also be advantageously used in the invention. One of ordinary skill in the art will recognize that blending mixtures of these materials can be used to "tune" the SBS performance for a particular application. For example, the frequency shift associated with each material is different. Where desired, the practitioner can obtain a precise frequency shift by the blending of two or more of these compounds.

Figures 1, 2A:
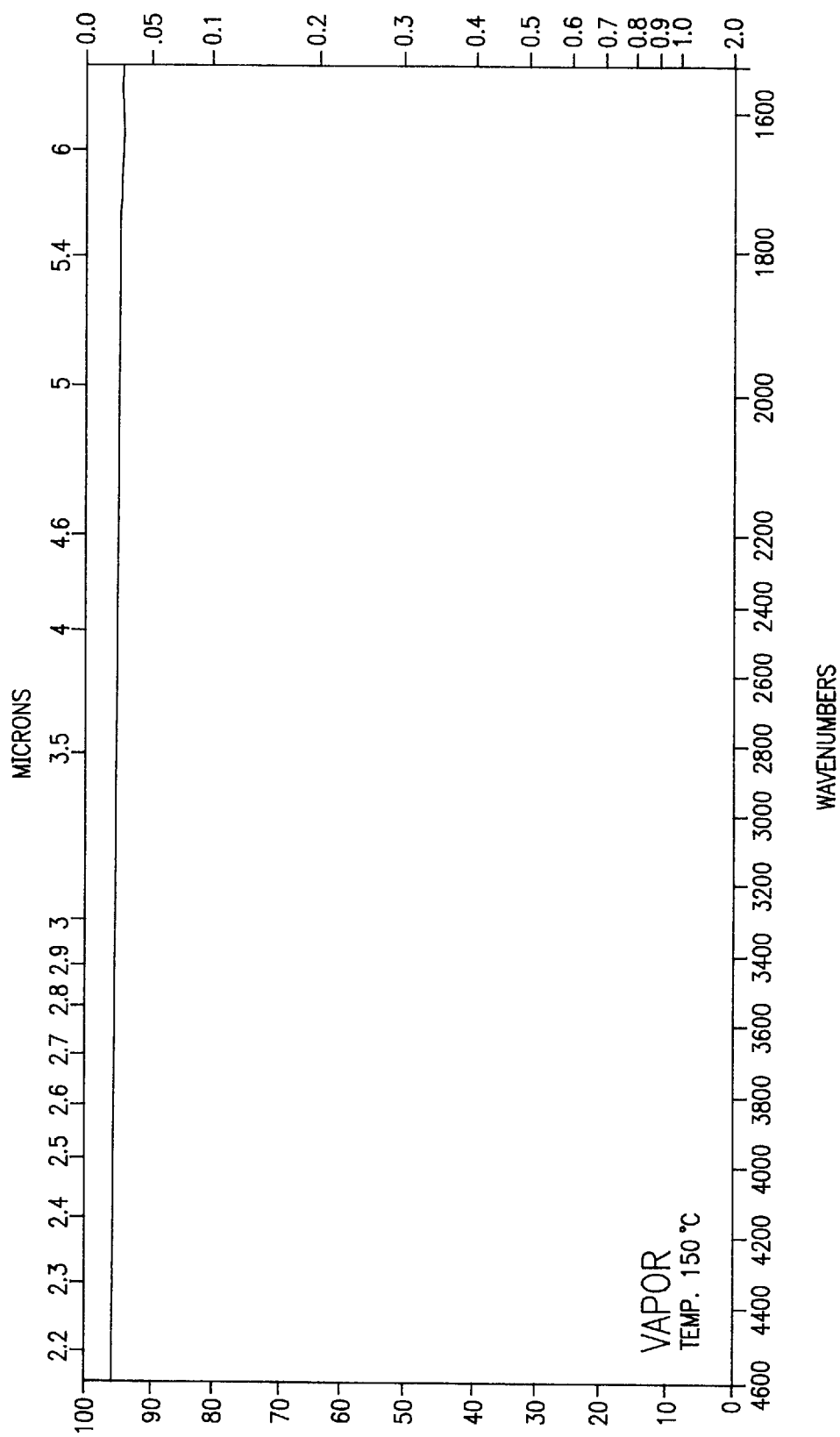
Figures 2, 2A:
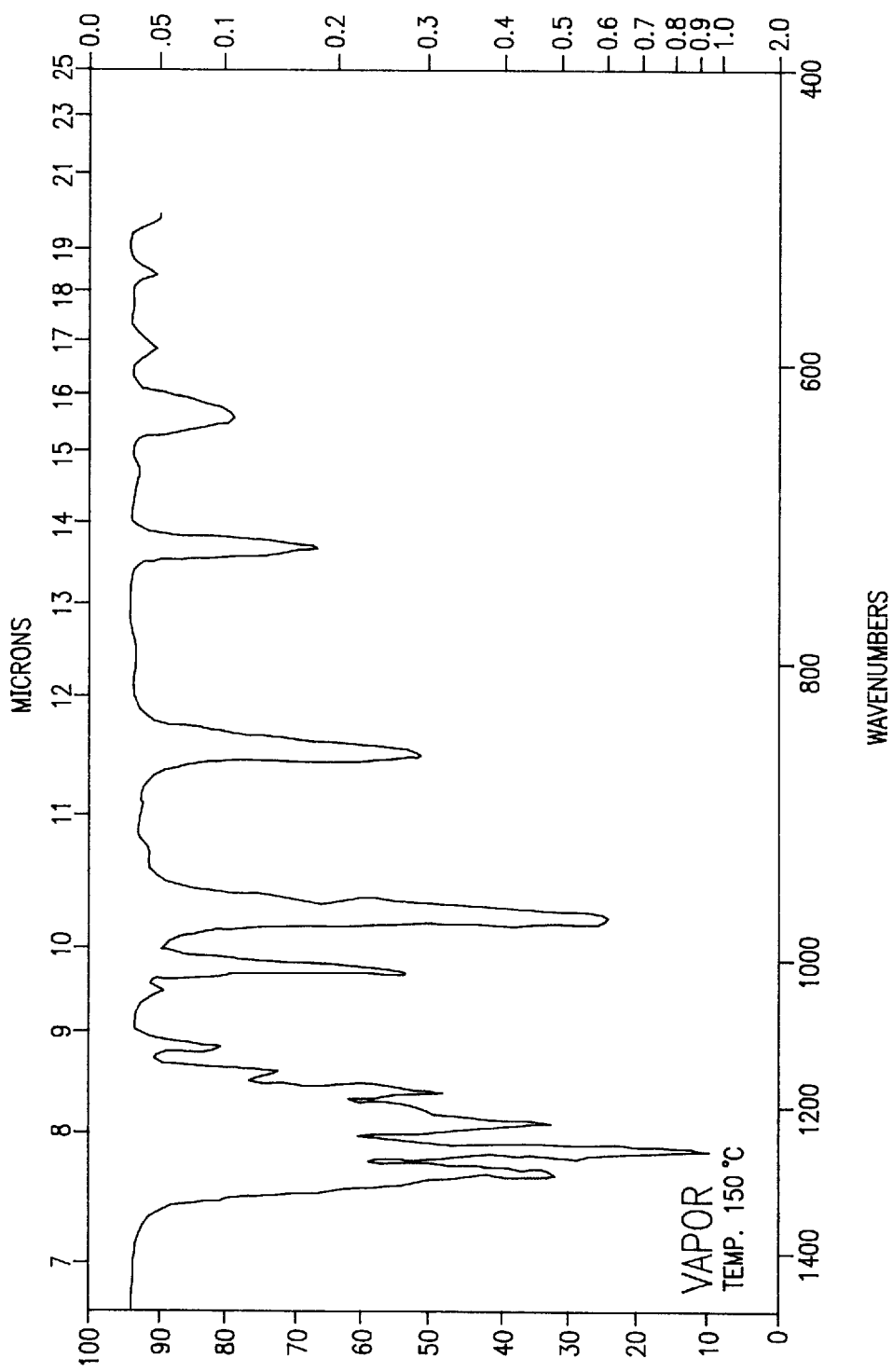
FIG. 2 shows the absorption spectrum of perfluoromethylcyclohexane and perfluoro-1,3-dimethylcyclohexane.
Figures 1, 2B:
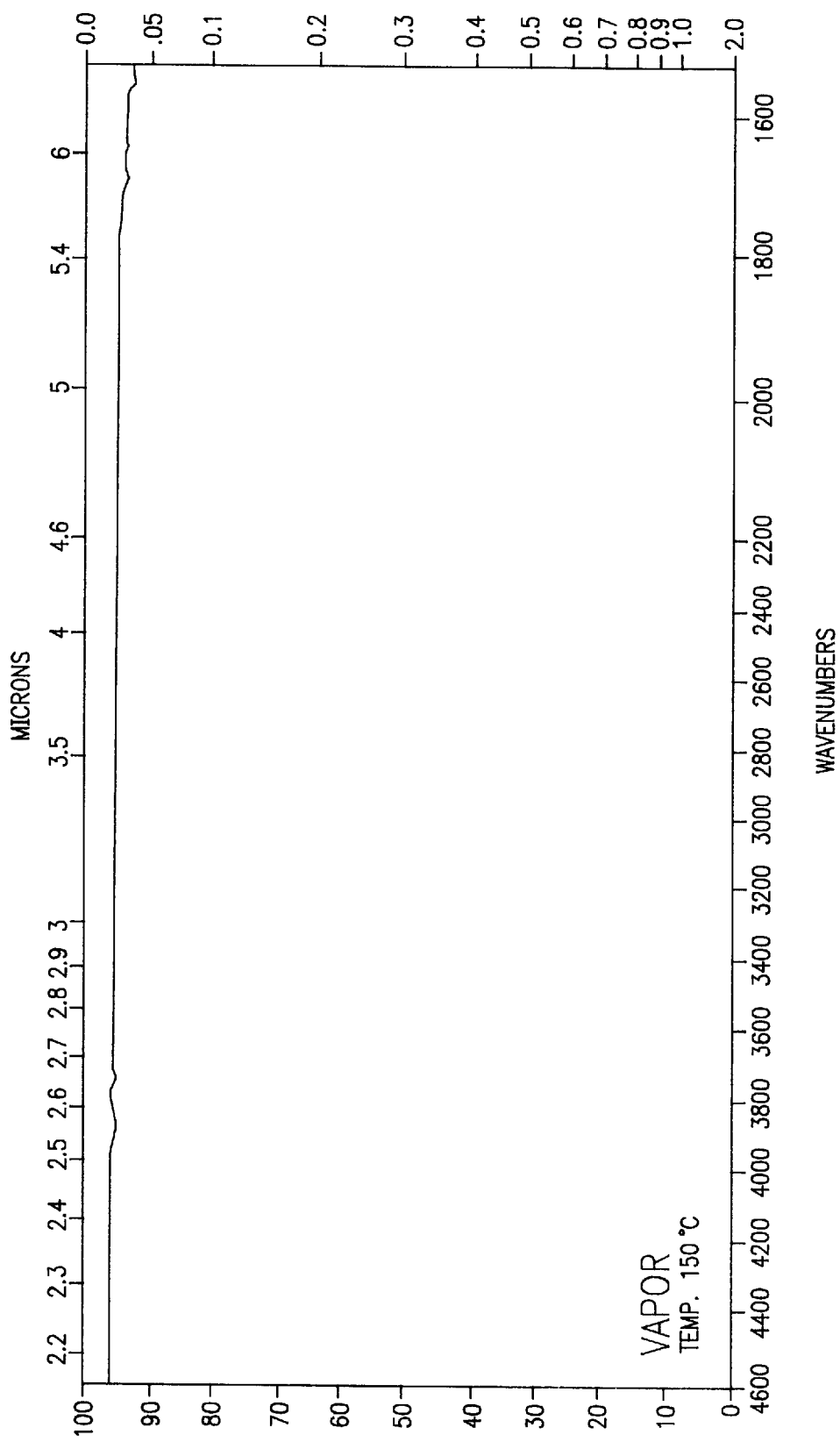
Figures 2, 2B:
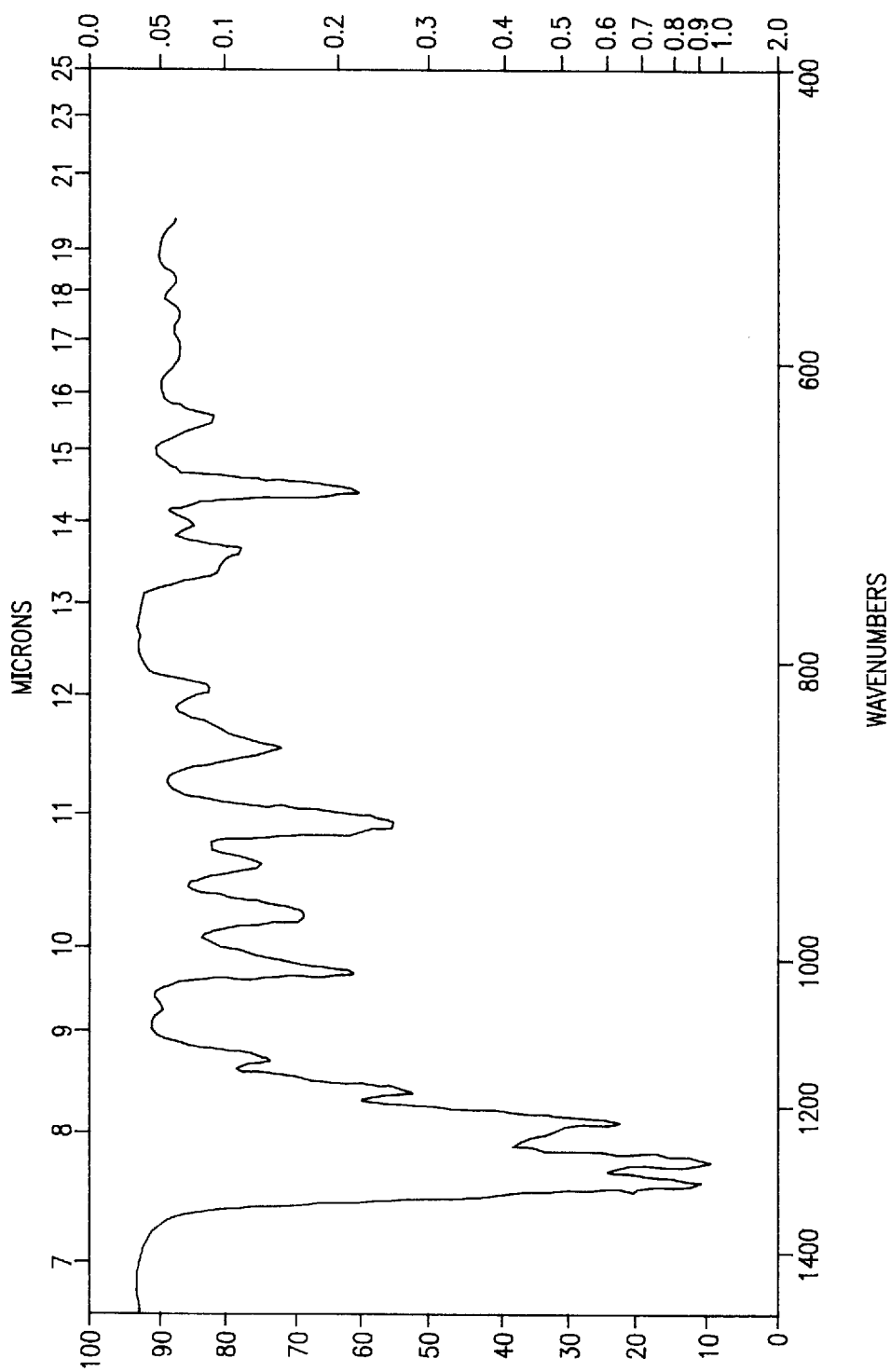

Referring now to FIG. 2, there are illustrated absorption spectrums for perfluoro-methylcyclohexane (top) and perfluoro-1,3-dimethylcyclohexane (bottom). As can be seen, these compounds are very transparent at the mid infrared wavelengths. Therefore, they are suitable for high power lasers such as Nd and Yb lasers.

Figures 3A, 3B:
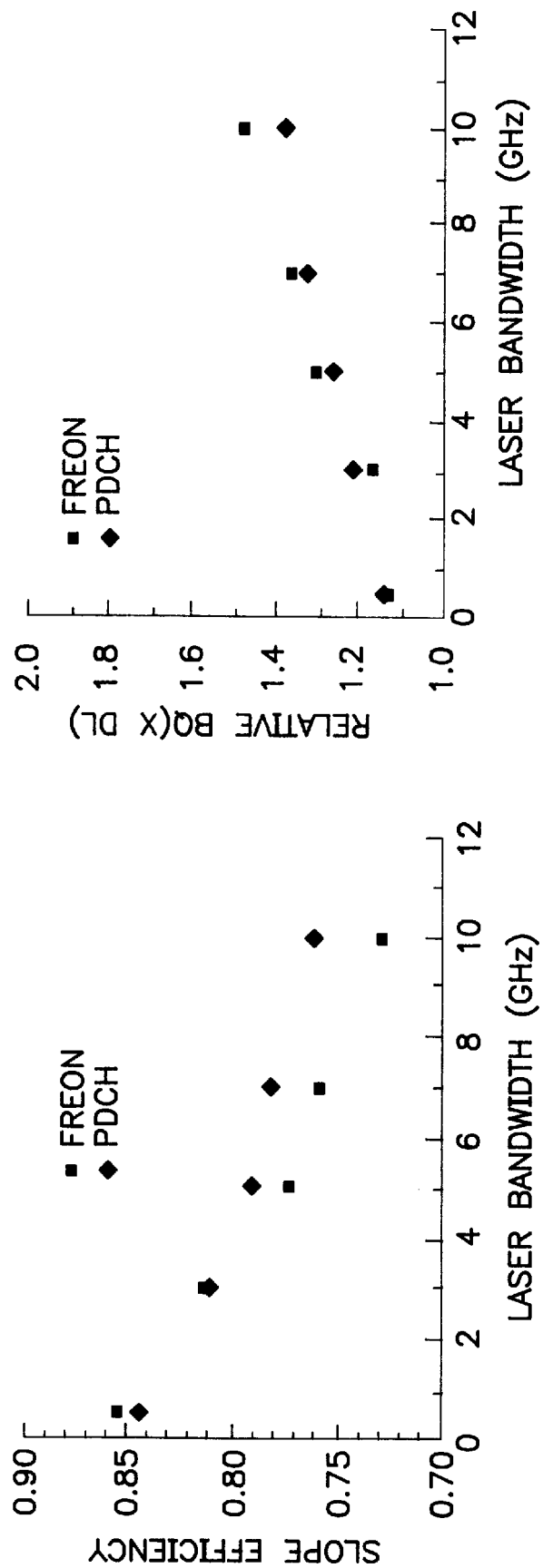
FIG. 3 shows a comparison of SBS reflectivity in conjugation fidelity of perfluoro-1,3-dimethylcyclohexane with Freon 113.

Referring now to FIG. 3, there are shown comparisons between the reflectivity and conjugation fidelity between Freon 113 (filled squares) and perfluoro-1,3-dimethylcyclohexane (filled diamonds). As can be seen, both perfluoro-1,3-dimethylcyclohexane and Freon 113 exhibit similar properties with respect to these parameters.

According to another aspect of the present invention, there is provided a laser having an amplifying medium. The laser comprises an SBS cell for reducing aberrations caused by inhomogeneities in the amplifying medium by phase conjugation. The components include a liquid perfluorocarbon as disclosed herein, as an SBS medium. The perfluorocarbon is selected from the group of compounds having the formula $C_xF_y$, wherein x>1 and y>4. Preferably, x>4 and y<16, and most preferably, 4<x<7 and 6<y<15. Examples of suitable liquid perfluorocarbons include $CF_4$, $C_2F_6$, $C_6F_6$, $C_6F_{11}$—$CF_3$ and $C_6F_{10}$—$(CF_3)_2$.

Lasers according to the present invention can have a power output greater than about 100 W. Further, lasers according to the present invention can have a beam quality less than about 2×D.L.

According to another aspect of the present invention, there is provided a method for reducing aberrations in a laser beam created when the beam passes through an amplifying medium. The method comprises the step of phase conjugating the amplified beam using an SBS cell having a liquid perfluorocarbon as the SBS medium. The liquid perfluorocarbon is selected from the group of compounds having the formula $C_xF_y$, wherein x>1 and y>4. Preferably, x>4 and y<16, and most preferably, 4<x<7 and 6<y<15. Examples of suitable liquid perfluorocarbons include $CF_4$, $C_2F_6$, $C_6F_6$, $C_6F_{11}$—$CF_3$ and $C_6F_{10}$—$(CF_3)_2$.

According to another embodiment of the present invention, there is provided a method of producing an output laser beam. The method comprises the steps of, first, generating an initial laser beam using a laser. Then, the initial laser beam is phase conjugated by SBS using a liquid perfluorocarbon medium as an SBS medium. The liquid perfluorocarbon is selected from the group of compounds having the formula $C_xF_y$, wherein x>1 and y>4. Preferably, x>4 and y<16, and most preferably, 4<x<7 and 6<y<15. The method can additionally comprise the step of amplifying the initial laser beam after the generating step.

EXAMPLE

Comparison tests were made using the laser assembly shown in FIG. 1. In a first test, Freon 113 was used in the SBS cell. In a second test, perfluoro-1,3-dimethylcyclohexanes was used in the SBS cell.

The two tests were conducted under identical conditions. After the test work was completed, comparisons of reflectivity and conjugation fidelity were made. These comparisons are shown in FIG. 3. As can be seen from these results, perfluoro-1,3-dimethylcyclohexane exhibits reflectivity and conjugation fidelity properties substantially similar to those exhibited by Freon 113. Therefore, this test work shows that perfluoro-1,3-dimethylcyclohexane can be conveniently used in place of Freon 113 without loss of performance and with considerably increased advantage to the environment.

Although the present invention has been discussed in considerable detail with reference to certain preferred embodiments thereof, other embodiments are possible. Therefore, the spirit and scope of the appended claims should not be limited to the description of the preferred embodiments contained herein.

We claim:

1. A device for producing phase conjugation of electromagnetic radiation using stimulated Brillouin scattering comprising a stimulated Brillouin scattering cell having a liquid perfluorocarbon as a stimulated Brillouin scattering medium, wherein the perfluorocarbon is selected from the group of compounds having the formula $C_xF_y$, wherein x>4 and y<16, and mixtures thereof.

2. The device according to claim 1, wherein x<7.

3. A device for producing phase conjugation of electromagnetic radiation using stimulated Brillouin scattering comprising a stimulated Brillouin scattering cell having a liquid perfluorocarbon as a stimulated Brillouin scattering medium, wherein the perfluorocarbon is selected from the group of compounds having the formula $C_xF_y$, wherein 4<x<7 and 6<y<15, and mixtures thereof.

4. A laser for producing a laser beam, the laser including a stimulated Brillouin scattering cell having a liquid perfluorocarbon as a stimulated Brillouin scattering medium, wherein the perfluorocarbon is selected from the group of compounds having the formula $C_xF_y$, wherein x>4 and y<16, and mixtures thereof.

5. A laser according to claim 4, having a power output greater than about 100 W.

6. A laser for producing a laser beam, the laser including a stimulated Brillouin scattering cell having a liquid perfluorocarbon as a stimulated Brillouin scattering medium, wherein the perfluorocarbon is selected from the group of compounds having the formula $C_xF_y$, wherein 4<x<7 and 6<y<15, and mixtures thereof.

7. A method of reducing the aberrations in a laser beam, such as aberrations created when the beam passes through an amplifying medium, the method comprising the step of generating phase conjugation by stimulated Brillouin scattering using a liquid perfluorocarbon as a stimulated Brillouin scattering medium, where the perfluorocarbon is selected from the group of compounds having the formula $C_xF_y$, wherein x>4 and y<16, and mixtures thereof.

8. The method according to claim 7, wherein x<7.

9. A method of reducing the aberrations in a laser beam, such as aberrations created when the beam passes through an amplifying medium, the method comprising the step of generating phase conjugation by stimulated Brillouin scattering using a liquid perfluorocarbon as a stimulated Brillouin scattering medium, where the perfluorocarbon is selected from the group of compounds having the formula $C_xF_y$, wherein 4<x<7 and 6<y<15 and mixtures thereof.

10. A method of producing an output laser beam, comprising the steps of:

(a) generating an initial laser beam using a laser; and (b) phase conjugating the initial laser beam by stimulated Brillouin scattering using a liquid perfluorocarbon medium as a stimulated Brillouin scattering medium, wherein the perfluorocarbon is selected from the group of compounds having the formula $C_xF_y$, wherein x>4 and y<16, and mixtures thereof.

11. The method according to claim 10, wherein the laser in the generating step is a solid state laser.

12. The method according to claim 10, additionally comprising the step of amplifying the initial laser beam after the generating step.

13. A method of producing an output laser beam, comprising the steps of:

(a) generating an initial laser beam using a laser; and (b) phase conjugating the initial laser beam by stimulated Brillouin scattering using a liquid perfluorocarbon medium as a stimulated Brillouin scattering medium, wherein the perfluorocarbon is selected from the group of compounds having the formula $C_xF_y$, wherein 4<x<7 and 6<y<15, and mixtures thereof.

* * * * *